June 20, 1961
W. A. MILLER ET AL
2,988,783
METHOD OF PRODUCING ELONGATED STRUCTURES
OF ISOTACTIC POLYSTYRENE
Filed Oct. 14, 1959
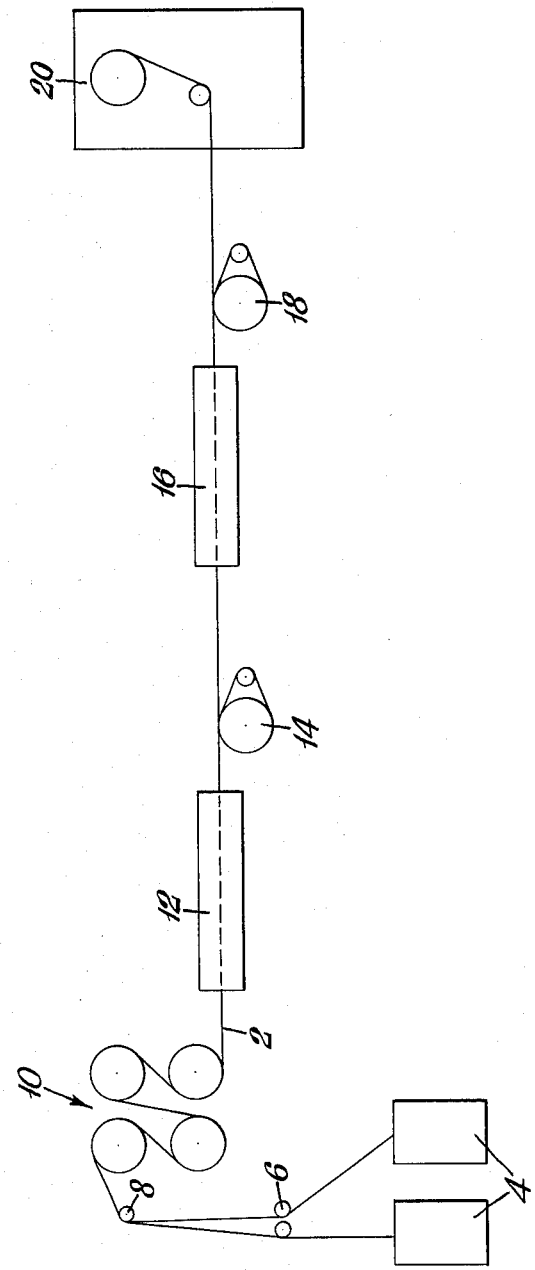
INVENTORS
WALTER A. MILLER
CHARLES N. MERRIAM, JR
STEPHEN O. COOK
BY *James C. Arrantes*
ATTORNEY

United States Patent Office 2,988,783
Patented June 20, 1961

2,988,783
METHOD OF PRODUCING ELONGATED STRUCTURES OF ISOTACTIC POLYSTYRENE

Walter A. Miller, Somerville, Charles N. Merriam, Jr., Martinsville, and Stephen O. Cook, Somerville, N.J., assignors to Union Carbide Corporation, a corporation of New York
Filed Oct. 14, 1959, Ser. No. 846,489
4 Claims. (Cl. 18—48)

This invention relates to elongated structures of isotactic polystyrene. More particularly, this invention relates to a method of producing elongated structures of isotactic polystyrene such as fibers, monofilaments, ribbons, and the like having improved physical and chemical properties.

Generally, the physical and chemical properties of crystallizable plastic material can be substantially improved by subjecting the plastic material to a single-step stretching operation at suitable temperatures, whereby the molecules of the material align themselves in the direction in which the stretch was applied, and crystallized, forming a crystal lattice. For example, a crystallizable plastic material, on being extruded in the shape of a monofilament at a temperature above its first order phase transition temperature and uni-directionally stretched at a temperature between its first and second order phase transition temperature in a single-step stretching operation by means of godet rolls or by the use of other suitable and well known stretching apparatus, will, as a rule, have its molecules align and crystallize.

Isotactic polystyrene, however, prior to being stretched, exists in the glassy, brittle state at room temperature wherein its molecules are rigidly coiled together in a highly disordered tangle. Consequently, elongated structures of isotactic polystyrene must be stretched at least about 750 percent in order for the molecules of the polymer to become sufficiently aligned so that substantial crystallization can occur.

The occurrence of "substantial crystallization" is demonstrated by the fact that the isotactic polystyrene has improved physical and chemical properties as evidenced by its thermal stability and its insolubility in organic chemicals such as tetrachloroethane and benzene. Thermal stability of isotactic polystyrene is indicated by its percent shrinkage as determined by the following procedure. An elongated structure of polystyrene, six inches in length, is heated in air at 200° C. for five minutes. Percent shrinkage is calculated by the following formula:

$$\text{Percent shrinkage} = \frac{100 \times \text{length before heating} - \text{length after heating}}{\text{length before heating}}$$

An elongated structure having a percent shrinkage of less than 20 percent is considered to be thermally stable.

Heretofore, attempts to effect a stretch of at least 750 percent in elongated structures of isotactic polystyrene at temperatures within which the molecules align and crystallize have resulted in a rupturing of the structure as the degree of tension developed in the polymer during the stretching operation has exceeded its strength.

It is an object of this invention, therefore, to provide for the production of elongated structures of isotactic polystyrene by a stretching operation wherein the elongated structure is stretched without rupturing to at least about 750 percent.

The present invention provides for stretching of an elongated structure of isotactic polystyrene under controlled conditions of temperature in two stages whereby the total degree of "stretch" effected is at least about 750 percent. Accordingly, an elongated structure of isotactic polystyrene is initially stretched from about 300 to about 650 percent at a temperature of about 115° C. to about 130° C. and then subjected to a second stretching operation at a temperature of about 125° C. to about 150° C. to effect a total uni-directional stretch of at least about 750 percent.

The term isotactic polystyrene as used herein refers to polystyrene which is stereoregular in that the phenyl groups of the polymer lie on the same side of the polymer chain.

For a detailed explanation of isotactic polystyrene, reefrence is made to the September 1957 issue of Scientific American which is herewith incorporated by reference, with particular reference therein to the article "How Giant Molecules Are Made" by Guilo Natta.

The percent stretch as noted in this application, wherein the stretching of elongated structures of isotactic polystyrene was effected using two sets of godet rolls, was determined by subtracting the linear speed of the first set of godet rolls from the linear speed of the second set of godet rolls, dividing the remainder by the linear speed of the first set of godet rolls and multiplying by 100.

Reference is now made to the accompanying drawing, which along with the discussion that follows, will more fully describe the present invention.

Unstretched isotactic polystyrene fiber tow 2 is fed from storage drums 4 over guides 6 and 8 and onto a constant speed feed roll assembly 10. In stretching fibers of polymeric material, it is convenient to stretch a collection of fibers, commonly referred to as a tow. It is not practical to stretch individual fibers due to their small size. The fiber tow 2 passes through constant speed feed roll assembly 10 into a heating zone 12 maintained at a temperature sufficient to bring the tow to a temperature of about 115° C. to about 130° C. From the heating zone 12 the tow 2 is passed to a godet roll assembly 14 which is operated at a linear speed of from about 4 to about 7.5 times faster than the linear speed of constant speed feed rolls 10 so that the tow 2 is stretched from about 300–650 percent at a temperature of about 115° C. to about 130° C. After leaving the first godet roll assembly 14, the tow is then passed through a second heated zone 16 which is maintained at a temperature such that the tow 2 is brought to a temperature of about 125° C. to about 150° C. The tow 2 is then passed to a second godet roll assembly 18 which is operated at a linear speed greater than the linear speed of godet roll assembly 14. The actual speed of the godet roll assembly 18 is such that the tow 2, i.e., each individual fiber in the tow, stretched at a temperature of between about 125° C. and about 150° C., has a total uni-directional stretch in the direction in which it is being pulled of at least about 750 percent. The maximum amount of total stretch that can be effected in the fibers is determined by the amount of tension that the fibers can sustain without rupturing. The tow can then be wound upon a spool assembly 20.

Monofilaments can, if lesired, be extruded, then cooled to a temperature of about 115° C. to about 130° C. and fed directly into the stretching apparatus and stretched according to the present invention. Also, any conventional "stretching" system such as a series of snubbing rolls can be used in lieu of the godet roll assemblies. The method of heating the elongated isotactic polystyrene structures is not critical. Any suitable means can be used, such as liquid heat, gas heat, or radiant heat, provided that the elongated structure is not adversely affected by the heating means used.

The following example further illustrates the present invention and is not intended to limit the scope thereof in any manner.

*Example 1*

Using the apparatus shown in the accompanying drawing wherein heating of the fiber tow was conducted in six-foot long electrically heated aluminum blocks, an unstretched 50 filament isotactic polystyrene tow was fed at the rate of 10 feet per minute through a ¼ inch slot in the aluminum block which was maintained at a temperature of 125° C. The polystyrene tow passed from the aluminum block to a godet roll assembly operated at 70 feet per minute. The percent stretch effected in the tow at this point was 600 percent.

From the first godet assembly, the tow passed through a second aluminum block identical to the first which was maintained at a temperature of 135° C. From this second aluminum block the tow was passed to a second godet roll assembly which was operated at a linear speed of 92 feet per minute. The percent stretch effected between the first and second godet roll assemblies was about 314 percent. From the second godet roll assembly the tow was wound up onto a spool. The highly oriented and crystalline isotactic polystyrene fiber had a tensile strength ASTM D-638-58T of 3.0-3.5 grams per denier, elongation ASTM D-638-58T of 25-35 percent, shrinkage of less than 20 percent, and was insoluble in tetrachloroethane.

In order to further indicate the necessity of stretching elongated structures of isotactic polystyrene to a percent stretch of at least about 750, an unstretched 50 fiber isotactic polystyrene tow was fed at the rate of 10 feet per minute through a ¼-inch wide slot in a six-foot long electrically heated aluminum block maintained at 135° C. to a godet roll assembly. The highest linear speed at which the godet roll assembly could be operated without fiber breakage was 80 feet per minute. Operating the godet roll at 80 feet per minute, the percent stretch of the fiber was 700 percent. The stretched fiber had a tensile strength of only 2.0-2.5 grams per denier, an elongation of 60 percent, shrinkage in excess of 50 percent, and was soluble in tetrachloroethane.

The following experiments were conducted in order to demonstrate the criticality of the temperature ranges within which the stretching operation is conducted in accordance with the present invention.

An unstretched 50 fiber tow was stretched in a manner described in Example 1 with the exception that the initial stretching of the fiber tow was accomplished at a temperature of 135° C. The fiber obtained at the conclusion of the two-step stretching operation had a thermal shrinkage in excess of 50 percent and was soluble in tetrachloroethane.

A second 50 fiber tow was also stretched in a manner described in Example 1 with the exception that the temperature of the tow in the second stage stretching operation was 120° C. The fibers obtained had a thermal shrinkage in excess of 50 percent and were soluble in tetrachloroethane.

What is claimed is:

1. Method of producing elongated structures of isotactic polystyrene having improved chemical and physical properties which comprises stretching said structure to effect a percent stretch of from about 300 to about 650 percent at a temperature of about 115° C. to about 130° C., and thereafter subjecting the initially stretched polystyrene structure to a second stretching operation at a temperature from about 125° C. to about 150° C., whereby the total stretch effected in the said structure is at least about 750 percent.

2. Method as defined in claim 1 wherein the first stage stretching operation is conducted at a temperature of about 125° C.

3. Method as defined in claim 1 wherein the second stage stretching operation is conducted at a temperature of about 135° C.

4. Method as defined in claim 1 wherein the first stage stretching operation is conducted at a temperature of about 125° C. and the second stage stretching operation is conducted at a temperature of about 135° C.

References Cited in the file of this patent

UNITED STATES PATENTS

| | | |
|---|---|---|
| 2,556,295 | Pace | June 12, 1951 |
| 2,900,220 | Shaw | Aug. 18, 1959 |

OTHER REFERENCES

Ser. No. 715,003, Wulff et al. (A.P.C.), published Apr. 27, 1943.